(12) United States Patent
Wang et al.

(10) Patent No.: US 9,143,328 B2
(45) Date of Patent: Sep. 22, 2015

(54) SYSTEM AND METHOD FOR PROVIDING A SYSTEM MANAGEMENT COMMAND

(75) Inventors: Lan Wang, Cypress, TX (US);
Valiuddin Y. Ali, Cypress, TX (US);
James L. Mondshine, Cypress, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 230 days.

(21) Appl. No.: 12/992,856

(22) PCT Filed: May 16, 2008

(86) PCT No.: PCT/US2008/063854
§ 371 (c)(1),
(2), (4) Date: Nov. 15, 2010

(87) PCT Pub. No.: WO2009/139779
PCT Pub. Date: Nov. 19, 2009

(65) Prior Publication Data
US 2011/0066839 A1    Mar. 17, 2011

(51) Int. Cl.
*G06F 21/31* (2013.01)
*H04L 9/32* (2006.01)
(Continued)

(52) U.S. Cl.
CPC .............. *H04L 9/321* (2013.01); *G06F 21/575* (2013.01); *H04L 9/3234* (2013.01); *G06F 9/4401* (2013.01); *G06F 9/4408* (2013.01);
(Continued)

(58) Field of Classification Search
CPC ..... G06F 9/4408; G06F 9/4401; G06F 21/57; G06F 21/31; G06F 21/572; G06F 21/575; H04L 9/321; H04L 9/3234

USPC ................... 713/1–2, 100; 726/4–7, 9, 17–20
See application file for complete search history.

(56) References Cited

U.S. PATENT DOCUMENTS 5,892,906 A * 4/1999 Chou et al. ...................... 726/19
6,370,650 B1    4/2002 Cromer et al.
(Continued)

FOREIGN PATENT DOCUMENTS

CN     1713101 A    12/2005
CN     1717082 A    1/2006
(Continued)

OTHER PUBLICATIONS

International Searching Authority, International Search Report and Written Opinion dated Jan. 30, 2009, pp. 12.
(Continued)

*Primary Examiner* — Jung Kim
*Assistant Examiner* — Ayoub Alata
(74) *Attorney, Agent, or Firm* — International IP Law Group, PLLC

(57) ABSTRACT

Exemplary embodiments of the present invention disclosed herein relate to a method of providing a system management command. The method comprises receiving from an authorized requestor information identifying the electronic device and a request to issue a system management command to the electronic device. The method additionally comprises providing, in response to the request, a system management command, information identifying a source of the command as a trusted source and the information identifying the electronic device. Also disclosed are an electronic device and a computer system according to the invention.

18 Claims, 2 Drawing Sheets

(51) Int. Cl.
    *G06F 9/44*     (2006.01)
    *G06F 21/57*    (2013.01)

(52) U.S. Cl.
    CPC ............... *G06F 21/31* (2013.01); *G06F 21/57* (2013.01); *G06F 21/572* (2013.01)

(56) References Cited

U.S. PATENT DOCUMENTS

| | | |
|---|---|---|
| 6,795,855 B2 | 9/2004 | Bonilla et al. |
| 7,089,300 B1* | 8/2006 | Birse et al. .................... 709/221 |
| 2003/0070099 A1* | 4/2003 | Schwartz et al. ............. 713/202 |
| 2005/0273603 A1* | 12/2005 | Girard ........................... 713/164 |
| 2006/0107320 A1* | 5/2006 | Bhatt et al. ...................... 726/22 |
| 2006/0129797 A1* | 6/2006 | Durfee et al. ....................... 713/2 |
| 2006/0277590 A1* | 12/2006 | Limont et al. ..................... 726/1 |
| 2008/0140820 A1* | 6/2008 | Snyder et al. .................. 709/223 |
| 2008/0172556 A1* | 7/2008 | Ishikawa et al. ................... 713/2 |
| 2009/0052675 A1* | 2/2009 | Levow et al. ................... 380/278 |
| 2009/0089566 A1* | 4/2009 | Natu et al. ......................... 713/2 |
| 2009/0276620 A1* | 11/2009 | McCarron et al. ............ 713/155 |
| 2010/0115092 A1* | 5/2010 | Westin ........................... 709/224 |
| 2010/0279652 A1* | 11/2010 | Sharp et al. ................... 455/410 |
| 2010/0279673 A1* | 11/2010 | Sharp et al. ................... 455/419 |
| 2011/0141276 A1* | 6/2011 | Borghei ......................... 348/143 |
| 2011/0276683 A1* | 11/2011 | Goldschlag et al. .......... 709/224 |

FOREIGN PATENT DOCUMENTS

| | | |
|---|---|---|
| JP | 1987-131352 | 6/1987 |
| JP | 06124266 | 5/1994 |
| JP | H1185701 A | 3/1999 |
| JP | 2001-075828 | 3/2001 |
| JP | 2005332093 A | 2/2005 |
| JP | 2005-332093 | 12/2005 |
| KP | 1020000060992 | 10/2000 |
| KR | 1020060002603 | 1/2006 |
| KR | 100782620 | 12/2007 |
| TW | 200731088 A | 8/2007 |
| TW | 200820081 A | 5/2008 |

OTHER PUBLICATIONS

Taiwan Office Action cited in Appl. No. 98115690 dated Sep. 15, 2014; 5 pages.
Notice of Allowance, JP Application No. 2011-509458, Date: Aug. 27, 2013, pp. 1-3.
Office Action, CN Application No. 200880129247.6, Date: Jan. 28, 2013, pp. 1-7.

* cited by examiner

200

SYSTEM AND METHOD FOR PROVIDING A SYSTEM MANAGEMENT COMMAND

BACKGROUND

Many security features have been introduced for use in electronic devices such as computer systems. Examples of security features include pre-boot authentication, theft deterrent and drive encryption to name just a few examples. The usage of security tokens such as fingerprint sensors, trusted platform modules (TPM) and smart cards is also gaining popularity. These features greatly enhance the security of electronic devices.

However, this increased security sometimes presents problems for authorized service personnel as well as the platform owner. In particular, authorized service personnel may be called upon to perform system management functions that security features have been designed to guard against. For example, an authorized service person may need to flash a system memory device that contains the system basic input-output (BIOS) system to replace corrupted program information. Flashing the BIOS may, however, require a security credential that is no longer available. Security credentials may become unavailable for a number of reasons. A user may forget or maliciously reset a system password. An employee whose fingerprint is needed to access a computer may quit a company or be otherwise unable or unwilling to provide the necessary authentication. In such cases, the rightful platform owner (the enterprise that owns the computer) may be blocked from access to the computer.

As another example, an authorized user may desire to reset a component of an electronic device that has become disabled as a result of a security feature. The component may be disabled as a security measure if, for example, the system experiences an excess number of bad authentication attempts. In addition, a system security device such as a fingerprint reader or TPM may be broken and need to be replaced with new hardware. If an authorized service person does not have access to required security credentials or a system component has become broken or disabled, the authorized person (using authorized person for both authorized service person and platform owner) may be unable to perform a system management function to place the system or component in working order. Moreover, the inability of an authorized user to perform needed management functions may render an otherwise valuable computer system permanently inoperative.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

In accordance with an exemplary embodiment of the present invention, a computer system is adapted to receive a system management command resulting from a request by an authorized user such as an authorized service person or the platform owner regardless of the possession of the security credentials required by the computer. Moreover, a system management command according to the present invention allows an authorized user to perform actions that would otherwise require the use of security credentials that are no longer available, that were never set initially or that were not feasible to be provided to a service person. By way of example, it may not be feasible or desirable to provide an important security credential such as a BIOS administrative password to a service person.

Examples of functions that may be performed using a system management command in accordance with an exemplary embodiment of the present invention include performing a system boot without password authentication, flashing the bootblock region of the system BIOS and flashing the non-bootblock region of system BIOS. Additional examples of functions that may be performed using a system management command include allowing system administrator privileges without proper authorization, allowing setup access as a user without proper authorization, resetting the system BIOS to a factory default state or resetting the system BIOS to a factory default state while saving identity information such as a universally unique identifier (UUID), for example. Further examples include resetting all system components to a factory default state, removing all BIOS users, removing all OS users, removing all BIOS security policies, removing all users or identifying a hardware profile to use.

An additional example of a function that may be performed using a system management command is resetting a system component that has been disabled for security reasons. In particular, a system management command may be used to disable a management engine (ME), reset a TPM, reset a theft deterrent technology (TDT) device, reset a fingerprint reader, reset a system board or the like. The example set forth below with respect to FIG. 1 gives additional detail about how a system management command may be employed to reset a system component that has been disabled for security reasons.

Figure 1:
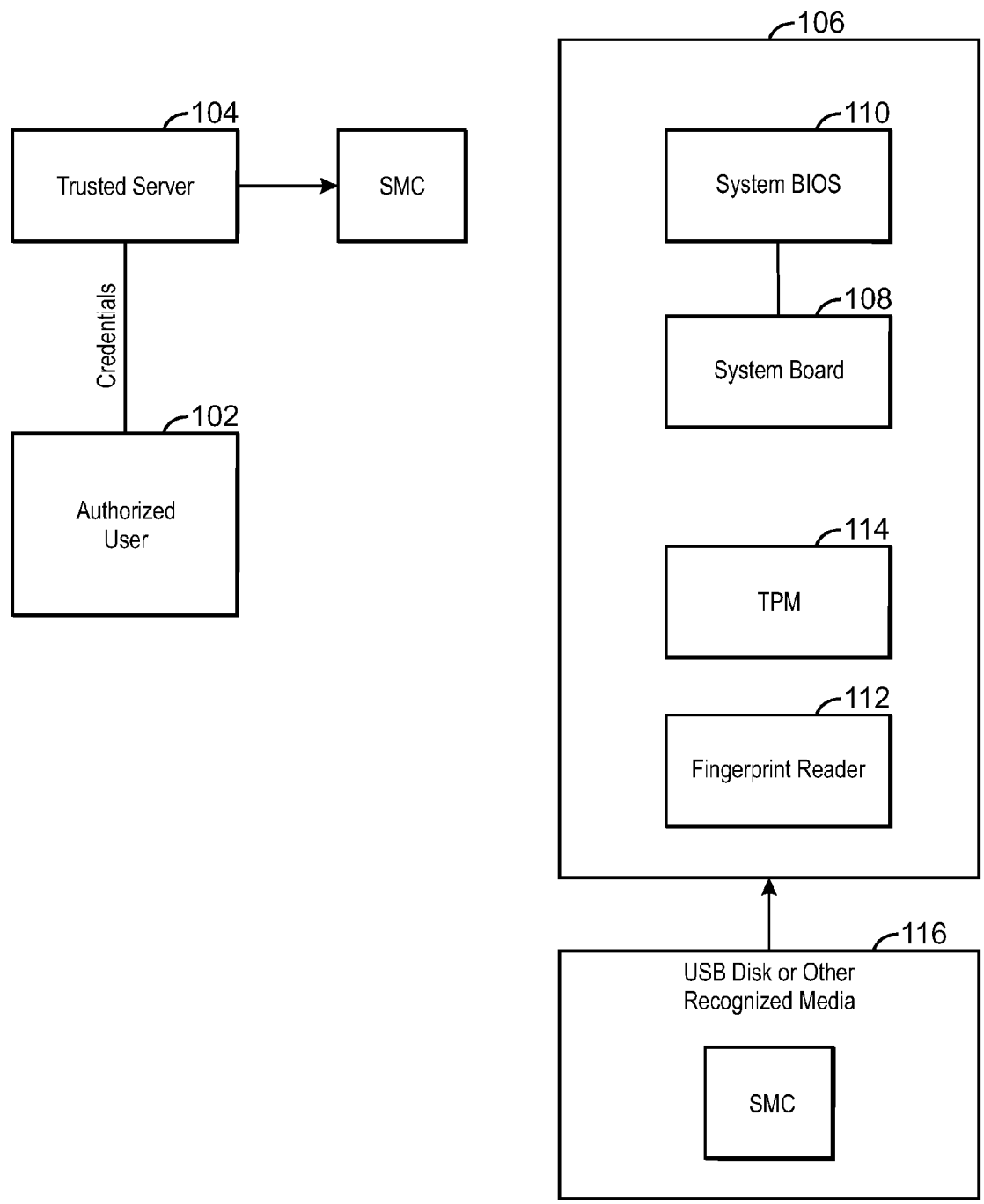
FIG. 1 is a block diagram of an infrastructure of computer systems that includes a computer that is adapted to receive a system management command in according to an exemplary embodiment of the present invention.

FIG. 1 is a block diagram of an infrastructure of computer systems that includes 1) a computer that is adapted to receive a system management command in according to an exemplary embodiment of the present invention; and 2) a trusted server that can generate the system management command that can be run on computers which are designed in according to an exemplary embodiment of the present invention. The infrastructure is generally referred to by the reference number 100. Those of ordinary skill in the art will appreciate that the functional blocks and devices shown in FIG. 1 may comprise hardware elements including circuitry, software elements including computer code stored on a machine-readable medium or a combination of both hardware and software elements. Additionally, the functional blocks and devices of the infrastructure 100 are but one example of functional blocks and devices that may be implemented in an exemplary embodiment of the present invention. Those of ordinary skill in the art would readily be able to define specific functional blocks based on design considerations for a particular electronic device.

The infrastructure 100 comprises an authorized user's computer 102 which may or may not be directly connected to a trusted server 104. In accordance with an exemplary embodiment of the present invention, an authorized user such as a service or repair person uses the authorized user's computer 102 or directly logs onto the trusted server 104 and is properly authenticated based on pre-defined criteria. After the authentication, the authorized user requests the trusted server 104 to issue a system management command to reset a component of an electronic device such as a security-restricted computer 106. The security-restricted computer 106 includes at least one security-restricted component. As used herein, the term "security-restricted" refers to a component or system that has entered a non-functional state as a result of a failure to receive a security credential such as a password, an encryption key, a biometric signature or the like. The purpose of placing a component in a security-restricted state is to prevent unauthorized access to the component or some other resource protected by the component. In many cases, the reason the component is placed in a security-restricted state is because an unauthorized source has attempted to use the component without providing the required security credentials.

An exemplary embodiment of the present invention is adapted to allow an authorized user to reset a security-restricted component using a system management command without a needed security credential when control of the electronic device containing the security-restricted component is recovered by an authorized source. For purposes of explaining an exemplary embodiment of the present invention, the following discussion assumes that the security-restricted computer 106 has at least one security component that is security-restricted without the proper security credentials. In other words, the security-restricted computer 106 includes at least one security-restricted component.

In one exemplary embodiment of the present invention, the security-restricted computer 106 comprises a system board 108. The system board 108 houses major components of the security-restricted computer 106 such as a system processor or CPU, a system memory and the like. The system board 108 may also store a system BIOS 110 in a memory device such as a non-volatile memory. The system BIOS is adapted to control a start-up or boot process and to control the low-level operation of the security-restricted computer 106.

The security-restricted computer 106 may have multiple levels of security. For example, a first level of security may include pre-boot security. Pre-boot security may operate to disable the system BIOS 110 if a security credential such as a Universal Serial Bus (USB) token or the like is not present. A second level of security may comprise hard drive encryption. In a system with hard drive encryption, access to encrypted data stored on a hard drive of the security-restricted computer 106 may be denied if a security credential is not present or provided by the user. A third level of security is operating system access. Access to the operating system of the security-restricted computer 106 may be denied if another security credential such as a password is not provided. If any one of the required security credentials is not provided, one or more components of the security-restricted computer 106, including the system board 108, may be placed into an inoperative state pending a reset operation in accordance with an exemplary embodiment of the present invention.

In addition, the security-restricted computer 106 may include one or more security components that are designed to prevent data theft or other unauthorized access to system resources. In the exemplary embodiment shown in FIG. 1, the security-restricted computer 106 includes a biometric access device such as a fingerprint reader 112. The security-restricted computer 106 also includes a trusted platform module (TPM) 114.

To reset a security-restricted component of the security-restricted computer 106 in accordance with an exemplary embodiment of the present invention, an authorized user such as a service or repair person makes a request to the trusted server 104 to issue a system management command to reset the security-restricted component on the security-restricted computer 106. The request to reset the security-restricted component may comprise a request to initialize the security-restricted component to a factory default state.

Along with the request to reset the security-restricted component, the authorized user provides information specifically identifying the security-restricted computer 106 to the trusted server 104. In an exemplary embodiment of the present invention, the information that identifies the security-restricted computer 106 may comprise a system UUID, a model and/or a serial number of the security-restricted computer 106, asset tag, MAC address or the like.

Access to the trusted server 104 may be restricted so that only authorized service technicians or platform owners are able to make requests to issue system management commands. Alternatively, authorized users may be required to prove their identity by providing security credentials such as a user-identification and a password to the trusted server 104.

Upon receiving a request to generate a system management command to reset a component of the security-restricted computer 106, the trusted server 104 may authenticate the identity of the authorized user. If the identity of the authorized user is authenticated, the trusted server 104 provides a system management command to reset a security-restricted component of the security-restricted computer 106 in response to the request. The system management command may correspond to the specific reset function set forth in the request by the authorized user.

In addition to the system-management command itself, the trusted server 104 may also generate or otherwise provide information identifying the trusted server 104 as a trusted source of the system management command. In one exemplary embodiment of the present invention, the information identifying the trusted server 104 as a trusted source may comprise a private key. Moreover, the system management command provided by the trusted server 104 may be signed with the private key. As set forth below, the trusted server 104 also provides the information identifying the security-restricted computer 106 that was received by the trusted server 104 from the authorized user via the authorized user's computer 102 or via other inputs. The system management command, the information identifying the source of the command as a trusted source and the information identifying the security-restricted computer 106 are collectively referred to as "SMC" in FIG. 1.

In one exemplary embodiment of the present invention, the system management command, the information identifying the source of the command as a trusted source and the information identifying the security-restricted computer 106 may be delivered directly to the security-restricted computer 106 if the security-restricted computer 106 is on the same network as the trusted server 104 and the security-restricted computer 106 is capable of network communication. Alternatively, the system management command, the information identifying the trusted server 104 as its source and the information identifying the security-restricted computer 106 may be delivered to the authorized user via the authorized user's computer 102. By way of example, the system management command, the information identifying the source of the command as a trusted source and the information identifying the security-restricted computer 106 may be stored on a security token such as a USB token 116, a smart card or the like associated with the authorized user's computer 102. The authorized user could take the token to the security-restricted computer 106 and use the token to reset the security-restricted component, as described below.

When the system management command, the information identifying the source of the reset command as the trusted server 104 and the information identifying the security-restricted computer 106 are received by the security-restricted computer 106, the security-restricted computer 106 authenticates the identity of the trusted server 104. In one exemplary embodiment of the present invention, the system BIOS 110 of the security-restricted computer 106 has access to a public key that corresponds to the private key which the trusted server 104 uses to sign the system management command. If the public key stored in the security-restricted computer 106 does not correspond to the private key used by the trusted server 104, the security-restricted computer 106 will refuse to perform the system management command to reset the security-restricted component.

An exemplary embodiment of the present invention may provide an authorized user with the ability to reprogram the public key. This feature allows the authorized user to use a private key/public key pair that is not known outside of the authorized user's organization. In particular, the authorized user may select a private key/public key pair that is not known by the manufacturer of the security-restricted computer 106, if desired.

In one exemplary embodiment of the present invention, multiple public key slots may be provided in the security-restricted computer 106. One or more of the public key slots may be reprogrammable. For example, a specific customer may reprogram one of the key slots with its organizational public key. An independent software vendor (ISV) providing some value-added functionality may override another slot. The specific key slots that are reprogrammable and who may reprogram them is an implementation detail and not an essential feature of the invention. In one example, the key slots could be reprogrammed on a first-come, first-serve basis or specific key slots may be designated for a specific purpose. One key slot may be designated for reprogramming by an OEM. A second key slot may be designated for a customer, a third key slot may be designated for an ISV and so on. In one exemplary embodiment, a key slot designated for use by the OEM that produced the computer is not reprogrammable.

The implementation details of the programming of the public keys in the additional key slots is an implementation detail that may vary based on system design criteria and/or security concerns. As one example, a policy from a BIOS administrator may prevent any additional keys from being programmed. Also, a particular key slot could be programmable only after collaboration with an OEM. Reprogramming of such a key slot may be permitted only when a special system management command that allows the provisioning of a key is provided by the OEM. In one exemplary embodiment, an end customer may be permitted to explicitly turn on the ability to program a public key via a BIOS administrative password or other safeguard. A similar arrangement may be implemented with respect to provisioning an ISV-provided public key or the like.

In one exemplary embodiment of the present invention, different key slots are adapted to allow different levels of system management commands to be performed. For example, an OEM-level key slot may be permitted to execute any system management command, including completely rewriting the system BIOS. Other key slots may be restricted from performing some system management commands. The use of keys having multiple permission levels permits a hierarchical command permission/access control scheme.

In one exemplary embodiment of the present invention, the security-restricted computer 106 also compares the information identifying the security-restricted computer 106 received from the trusted server 104 before performing the system management command to reset the security-restricted component. If the information identifying the security-restricted computer 106 does not correspond to information stored, for example, on its system board 108, the security-restricted computer 106 may refuse to perform the system management command to reset the security-restricted component even though the public key stored by the security-restricted computer 106 corresponds to the private key provided by the trusted server 104. In this manner, the security-restricted computer 106 is protected from hacker attacks such as an unauthorized request to reset the security-restricted component.

In one exemplary embodiment of the present invention, the system BIOS 110 may act as a system management command processor that is adapted to respond to information received from the trusted server 104 and to execute a system management command to, for example, reset a security-restricted component of the security-restricted computer 106 if the information received from the trusted server 104 is successfully authenticated. Upon reboot of the security-restricted computer 106, the system BIOS 110 may be adapted to detect a special key sequence designed to inform the system BIOS 110 that a system management command is being processed. The BIOS may then authenticate the information identifying the trusted server 104 as a trusted source and verify that the information identifying the security-restricted computer 106 received from the trusted server 104 does indeed correspond to identification information stored in the security-restricted computer 106. If the identity of the trusted server 104 and the information identifying the security-restricted computer 106 are both authenticated, the system BIOS 110 executes the system management command to reset the security-restricted component to a usable state such as a factory default state. In another exemplary embodiment of the present invention, the system management command is delivered to the security-restricted computer 106 via a network connection using any of the available protocols. The system management command may be delivered by a proxy to the BIOS using, for example, a Windows Management Instrumentation (WMI). Upon reboot, the system BIOS 110 may automatically detect the delivery of the system management command and start the command processing sequence. Moreover, those of ordinary skill in the art will appreciate that exemplary embodiments of the present invention facilitate remote and automated delivery of authenticated and secure system management commands that may be processed upon the reset (restart) of the system.

Figure 2:
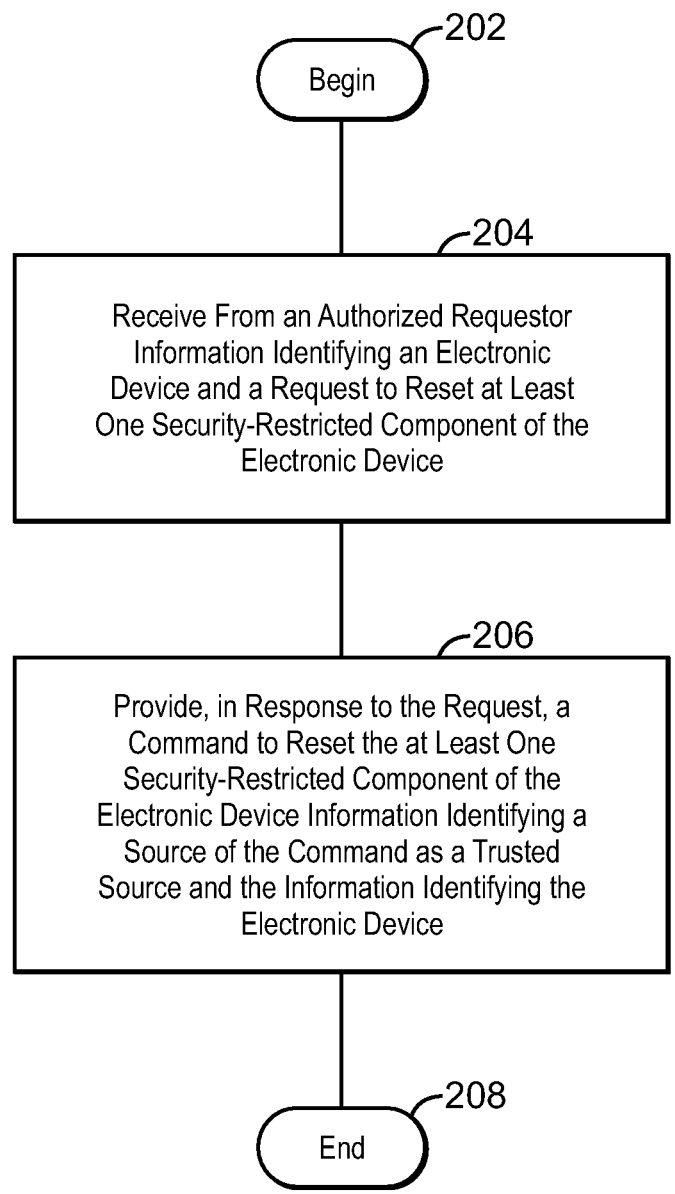
FIG. 2 is a flow chart showing a method of using a system management command to reset a security-restricted component of an electronic device according to an exemplary embodiment of the present invention.

FIG. 2 is a flow chart showing a method of using a system management command to reset a security-restricted component of an electronic device according to an exemplary embodiment of the present invention. The method is generally referred to by the reference number 200.

The method begins at block 202. At block 204, a request to issue a system management command to reset at least one security-restricted component of an electronic device is received from an authorized user. Information identifying the electronic device is also received. At block 206, a system management command to reset the at least one security-restricted component is provided in response to the reset request received at block 204. Along with the system management command itself, information identifying the source of the command as a trusted source and the information identifying the electronic device is also provided. The method ends at block 208.

Those of ordinary skill in the art will appreciate that exemplary embodiments of the present invention reduce information technology maintenance costs by providing a way to issue a system management command to a computer system even if the required security credentials are not available. Moreover, exemplary embodiments of the present invention provide a secure way to reuse components that would otherwise be rendered permanently inoperative because of an inability to provide a required security credential.

What is claimed is:

1. A method of providing a system management command, the method comprising:
   receiving, at a trusted server from a first electronic device, information identifying a second electronic device and a request to issue a system management command to the second electronic device;
   authenticating, at the trusted server, an identity of a user of the first electronic device; and
   in response to the request, providing, from the trusted server to the second electronic device, a system management command, information identifying the trusted server as a trusted source, information identifying the first electronic device, and the information identifying the second electronic device.

2. The method recited in claim 1, wherein the system management command comprises a request to reset a security-restricted component of the second electronic device.

3. The method recited in claim 2, wherein the at least one security-restricted component comprises a system board.

4. The method recited in claim 1, wherein the system management command comprises a request to perform a system boot without password authentication.

5. The method recited in claim 1, wherein the system management command comprises a request to flash a region of a system basic input-output system (BIOS).

6. The method recited in claim 1, comprising delivering the system management command, the information identifying the source of the command and the information identifying the second electronic device to the authorized requestor.

7. The method recited in claim 1, comprising executing the system management command based on an evaluation of the information identifying the source of the command and the information identifying the second electronic device.

8. The method recited in claim 1, wherein the information identifying the source of the command as a trusted source comprises a private encryption key signature of the system management command, wherein the private encryption key used to sign the system management command corresponds to one of a plurality of public encryption keys that the second electronic device has access to, and wherein a first set of one or more of the plurality of public encryption keys has a different permission level than a second set of one or more of the plurality of public encryption keys to facilitate a hierarchical command permission control scheme.

9. An electronic device, comprising:
   a component that is adapted to accept a security credential; and
   a system management command processor that is adapted to perform a system management command on the component that would otherwise require the security credential upon receipt, from a trusted server, of:
      the system management command,
      information identifying the trusted server as a trusted source,
      information identifying a second electronic device, and
      information identifying the electronic device,
      the system management command being provided by the trusted server in response to a request from the second electronic device and authentication of an identity of a user of the second electronic device.

10. The electronic device recited in claim 9, wherein the system management command comprises a request to reset the component.

11. The electronic device recited in claim 10, wherein the component comprises a system board.

12. The electronic device recited in claim 9, wherein the system management command comprises a request to perform a system boot without password authentication.

13. The electronic device recited in claim 9, wherein the system management command comprises a request to flash a region of a system basic input-output system (BIOS).

14. The electronic device recited in claim 9, wherein the system management command, the information identifying the source of the command and the information identifying the electronic device are received by the electronic device from the trusted source.

15. The electronic device recited in claim 9, wherein the information identifying the source of the command as a trusted source comprises a private encryption key signature of the system management command,
   wherein the private encryption key used to sign the system management command corresponds to one of a plurality of public encryption keys that the electronic device has access to, and wherein a first set of one or more of the plurality of public encryption keys has a different permission level than a second set of one or more of the plurality of public encryption keys to facilitate a hierarchical command permission control scheme.

16. A computer system, comprising:
   a security component that is adapted to accept a security credential; and
   a system basic input-output system (BIOS) that is adapted to perform a system management command that would otherwise require providing the security credential on the security component upon receipt, from a trusted server, of:
      a system management command,
      information identifying the trusted server as a trusted source,
      information identifying a second electronic device, and
      information identifying the computer system,
      the system management command being provided by the trusted server in response to a request from the second electronic device and authentication of an identity of a user of the second electronic device.

17. The computer system recited in claim 16, wherein the system management command, the information identifying the source of the system management command and the information identifying the computer system are received by the computer system from the trusted source.

18. The computer system recited in claim 16, wherein the system management command, the information identifying the source of the system management command and the information identifying the computer system are received by the computer system from the authorized requestor.

* * * * *